United States Patent [19]

Suzuki et al.

[11] Patent Number: 5,777,641
[45] Date of Patent: Jul. 7, 1998

[54] RECORDING APPARATUS AND SHADING CORRECTION METHOD

[75] Inventors: Akio Suzuki, Yokohama; Toshimitsu Danzuka, Tokyo, both of Japan

[73] Assignee: Canon Kabushiki Kaisha, Tokyo, Japan

[21] Appl. No.: 884,617

[22] Filed: Jun. 27, 1997

Related U.S. Application Data

[63] Continuation of Ser. No. 385,380, Feb. 7, 1995, abandoned, which is a continuation of Ser. No. 917,428, Jul. 23, 1992, abandoned.

[30] Foreign Application Priority Data

Jul. 26, 1991 [JP] Japan ................... 3-187743

[51] Int. Cl.$^6$ ..................... B41J 2/205; B41J 29/393
[52] U.S. Cl. ........................... 347/15; 347/15
[58] Field of Search ................. 347/14, 15, 9, 347/43, 191, 19, 188, 236

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,723,129 | 2/1988 | Endo et al. . |
| 4,740,796 | 4/1988 | Endo et al. . |
| 4,829,323 | 5/1989 | Suzuki et al. . |
| 4,853,768 | 8/1989 | Suzuki et al. . |
| 4,860,026 | 8/1989 | Matsumoto et al. . |
| 4,882,621 | 11/1989 | Suzuki et al. . |
| 4,908,635 | 3/1990 | Iwasawa et al. ............ 347/14 |
| 4,959,659 | 9/1990 | Sasaki et al. . |
| 5,016,097 | 5/1991 | Shimano . |
| 5,077,605 | 12/1991 | Ikeda et al. . |
| 5,142,374 | 8/1992 | Tajika et al. ............... 347/15 |
| 5,276,459 | 1/1994 | Danzuka et al. ............ 347/14 |

FOREIGN PATENT DOCUMENTS

| | | |
|---|---|---|
| 54-056847 | 5/1979 | Japan . |
| 159661 | 10/1982 | Japan ............... 347/15 |
| 0039468 | 3/1983 | Japan . |
| 59-123670 | 7/1984 | Japan . |
| 59-138461 | 8/1984 | Japan . |
| 60-071260 | 4/1985 | Japan . |
| 128836 | 5/1989 | Japan ............... 347/15 |

*Primary Examiner*—David F. Yockey
*Attorney, Agent, or Firm*—Fitzpatrick, Cella, Harper & Scinto

[57] ABSTRACT

There are provided a dark head and a light head for ejecting a dark ink and a light ink, respectively. First, an image is recorded by using the light head, and shading correcting data is set on the basis of the image. Second, images recorded by using the dark and the light heads are superimposed on each other, at this time, the image by the light head is recorded on the basis of the shading correcting data. Thereafter, with respect to the dark head, the shading correcting data is set on the basis of the superimposed images. As a result, when images recorded by the light and the dark heads are superimposed, the images have no shading.

13 Claims, 11 Drawing Sheets

ND SHADING
RECORDING APPARATUS AND SHADING CORRECTION METHOD

This application is a continuation of application No. 08/385,380, filed Feb. 7, 1995, which was a continuation of application No. 07/917,428, filed Jul. 23, 1992, both now abandoned.

BACKGROUND OF THE INVENTION

1. Field of the Invention

The present invention relates to a recording apparatus and a shading correcting method, and particularly to a recording apparatus in which a plurality of recording heads are provided to record, and a method for correcting shading in recorded images.

2. Description of the Prior Art

As a construction for representing gray scale in the recording apparatus, there is known an apparatus including a plurality of recording heads of which the gray level of the records are different from one another. For example, in a recording apparatus of ink jet type, there are provided recording heads (dark heads) for ejecting dark tone ink and recording heads (light heads) for ejecting light tone ink.

FIG. 1 is a graph showing a driving duty ratio of the dark head to the light head in response to the gray level of the image represented by an inputted signal in the above construction.

When the gray level of the image is low, only the light head can be used, and when the gray level of the image represented by the inputted signal is more than the predetermined value P, the driving duty ratio of the light head can be decreased and that of the dark head can be gradually increased. That is, when a gray level signal which is more than the predetermined value P is inputted, the driving duty ratio of the dark head to the light head is determined in accordance with the gray level signal, and the light head and the dark head are used according to that driving duty ratio. For example, in the case where the driving duty ratio of the light head to the dark head is three to one, one pixel of recorded image is composed of three light tone ink droplets and one dark tone ink droplet. By driving these heads in such a manner, the relation shown in FIG. 2 may be obtained, in which the gray level of the recorded image is varied linearly with that of the inputted image. Although such a relation may be also obtained by using only the dark head, there is such an advantage that rough appearances produced by dots in low gray level parts in the recorded image are decreased and an image with a smooth gradation of gray level may be obtained.

In a recording apparatus using recording heads, recording heads having a plurality of recording elements are generally used in order to increase a recording speed. For example, a multiple head is generally used in a recording head of ink jet type, in which a plurality of ink orifices are integrated. Further, in a thermal head used in a thermal printing system, a plurality of heaters (heating elements) are generally integrated.

Because it is difficult to fabricate equally in quality all of the recording elements, there is, some variation in characteristics of these recording elements. For example, in the multiple heads used in the ink jet system, there are some variations of the form of an orifice or an ink path connected to the orifice. Further, in the multiple heads used in the thermal printing system, there are some variations in the form of heaters, or the resistance value of the heaters. Such variations of the characteristic between recording elements affect the magnitude and the gray level of dots, so that the shading in the recorded image are produced.

In order to solve these problems, there have been proposed various methods in which the image having smooth gray level gradation can be obtained by correcting a driving signal applied to the recording element. For example, in a multiple head 1 in which a plurality of recording elements 2 are arranged in a line, as shown in FIG. 3A, when the equal input signals are applied to each of the recording elements as shown in FIG. 3B, and when the inequality of gray level is produced as shown in FIG. 3C, the inputted signals are corrected as shown in FIG. 3D so that a large input signal is applied to the recording element corresponding to the position where the gray level of the recording is lower and a small inputted signal is applied to the recording element corresponding to the position where that of the record is higher.

More concretely, if it is possible for the recording system to change the dot diameter or the dot gray level, the diameter of the dot recorded by each recording element can be changed according to the inputted signal. For example, the distribution of the gray level may be equalized as shown in FIG. 3E, in an ink jet system of the type where the ink is ejected by using the pressure produced by a piezo-electric element, by changing a driving voltage or pulse width applied to each piezo-electric element according to the inputted signal, and equalizing the diameter or the gray level of the dots recorded by each recording element, while and similarly, in the thermal printing system, by changing a driving voltage or pulse width applied to each heater according to the inputted signal, and equalizing the diameter or the gray level of the dots. When it is impossible or at least difficult to change the dot diameter or the dot gray level, the distribution of the gray level may be equalized as shown in FIG. 3E by changing the number of dots according to the inputted signal, and recording a greater number of dots by means of the recording element corresponding to the position where the dot gray level is lower while recording fewer dots by means of the recording element corresponding to the position where the dot gray level is higher.

The quantity to be corrected can be determined as follows. The correction of the shading in the recorded image caused by the variation in characteristics of the recording elements in the multiple head having 256 orifices used in an ink jet system will be explained hereinafter as an example.

Assuming that the distribution of the gray level of the dots recorded by a certain equal image signal S is that shown in FIG. 4. First, the mean gray level $\overline{OD}$ is obtained. Second, the gray levels $OD_1$ to $OD_{256}$ each of which corresponds to each orifice respectively are measured. Finally, the following equation is solved.

$$\Delta OD_n = \overline{OD} - OD_n \quad (n=1 \text{ to } 256) \tag{1}$$

Assuming that the relation between a value of the image signal and an outputted gray level is that shown in FIG. 5, the correction of the gray level by $\Delta OD_n$ can be performed by the correction of the image signal by $\Delta S$. Such correction is obtained by applying table transformation as shown in FIG. 6 to the image signal. In FIG. 6, straight line A is such a line that its gradient is 1.0, thus the input is outputted as it is. When the gradient of a straight line B is $(S-\Delta S)/S$, the output is $S-\Delta S$ when $S$ is inputted.

Accordingly, if the image signal corresponding to the n-th orifice is processed by the table transformation as the straight line B shown in FIG. 6, and the recording heads are driven, the gray level at the position recorded by the ink ejected from the n-th orifice is equal to OD.

By performing such processing for all the orifices, the shading in the recorded image is corrected. In other words, if the data regarding the table transformation to be performed are determined in advance for all image signals corresponding to the orifices, it is then possible to correct the shading.

However, in an apparatus using a plurality of recording heads corresponding to the dark tone ink and the light tone ink as described above, when the image gray level signal having a value more than the predetermined value P as shown in FIG. 1 is inputted, the recordings by both the dark and the light heads are superimposed on each other. In such a case, even if the above correction of the shading is performed independently to each recording head, the shading is not always corrected. If the phase of pattern of the shading caused by each recording head matched to each other, the shading may be emphasized and may become remarkable in the image.

SUMMARY OF THE INVENTION

An object of the present invention is to provide an apparatus, wherein it is possible to obtain an image that is free of undesirable shading when recordings by a plurality of recording heads are superimposed on each other, and a shading correcting method therefor.

In the first aspect of the present invention, a recording apparatus for performing recording by using a plurality of recording heads, each head having a plurality of recording elements, comprises:

a first recording means for recording a predetermined first image by using one or more of the plural recording heads;

a first correcting data setting means for setting a first shading correcting data corresponding to each of the one or more recording heads used in the first recording means, on the basis of the first predetermined image recorded by the first recording means;

a second recording means for recording a second predetermined image by using one of the one or more recording head, this one recording heads having been corrected on the basis of the first shading correcting data set by the first correcting data setting means, and another recording head which is motors of the one or more recording heads; and a second correcting data setting means for setting a second shading correcting data corresponding to the another recording head used in the second recording means, on the basis of the second predetermined image recorded by the second recording means.

Here, the one of the one or more recording heads and the another recording head may be used at respective predetermined ratios corresponding to a gray level of an image to be recorded in the recording apparatus.

Density of images recorded by using each of respective recording materials in the one of the one or more recording heads and the another recording head may be different from each other, respectively.

Density of images recorded by using the respective recording materials in the one of the one or more recording heads may be lower than that in the another recording head.

Each of the plural recording heads may utilize thermal energy to generate bubble(s) in ink, and eject the ink due to the growth of the bubble(s).

The recording apparatus may be provided with a plurality of recording heads.

In the second aspect of the present invention, a shading correcting method of the recording apparatus for performing recording by using a plurality of recording heads, head having a plurality of recording elements, comprises the steps of:

recording a first predetermined image by using one or more recording heads of the plurality of recording heads, in a first step;

setting a first shading correcting data corresponding to each of the plural recording elements of one of the one or more recording heads used in the first step, on the basis of the first predetermined image, in a second step;

recording a second predetermined image by using the one of the one or more recording heads, the one of the one or more recording heads having been corrected on the basis of the first shading correcting data set by the second step, and another recording head except which is not one of the one or more recording heads, in a third step; and setting a second shading correcting data corresponding to each of the plural recording elements of the another recording head used in the third step, on the basis of the second predetermined image recorded by the third step.

Here, the recording apparatus may be provided with plural heads.

In the third aspect of the present invention, a recording method comprises the steps of:

a first step of providing a plurality of recording heads, each head having a plurality of recording elements;

a second step of recording a first predetermined image by using one or more recording heads of the plural of recording heads;

a third step of setting a first shading correcting data corresponding to each of the plural recording elements of one of the one or more recording heads used in the second step, on the basis of the first predetermined image;

a fourth step of recording a second predetermined image by using the one of the one or more recording heads, the one of the one or more recording heads having been corrected on the basis of the shading correcting data set by the third step, and another recording head which is not one of the one or more recording heads;

setting a second shading correcting data corresponding to each of the plural recording elements of the another recording head used in the fourth step, on the basis of the second predetermined image recorded by the fourth step; and performing recording by using the one of the one or more recording heads and the another recording head, the recording heads having been corrected on the basis of respective the shading correcting data.

In the fourth aspect of the present invention, a recorded product comprises:

a recording medium; and a plurality of dots formed on the recording medium by a recording method using a plurality of recording heads, each head having a plurality of recording elements, the recording method comprising the steps of:

providing a plurality of recording heads, each having a plurality of recording elements in a first step;

recording a first predetermined image by using one or more recording heads of the plurality of recording heads, in a second step;

setting a first shading correcting data corresponding to each of the plural recording elements of the one of the one or more recording heads used in the second step, on the basis of the first predetermined image, in a third step;

recording a second predetermined image by using the one of the one or more recording heads, the one of the one or more recording heads having been corrected on the basis of the first shading correcting data set by the third step, and another recording head which is not one of the one or more recording heads, as a fourth step;

setting a second shading correcting data corresponding to each of the plural recording elements the another recording head used in the fourth step, on the basis of the second predetermined image recorded by the fourth step; and performing recording by using the one of the one or more recording heads and the another recording head, each recording head having been corrected on the basis of respective shading correcting data.

According to the present invention, first, the shading regarding one of the recording heads is corrected. Second, the recordings of both the corrected recording head and the other recording head are superimposed on each other. The shading regarding the later recording head is corrected on the basis of the result of the superimposed recording. As a result, even if there are some variations in of characteristics not corrected for each recording head, the shading are never enhanced.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Hereinafter, embodiments of the present invention will be explained in detail.

Embodiment 1

Figure 7:
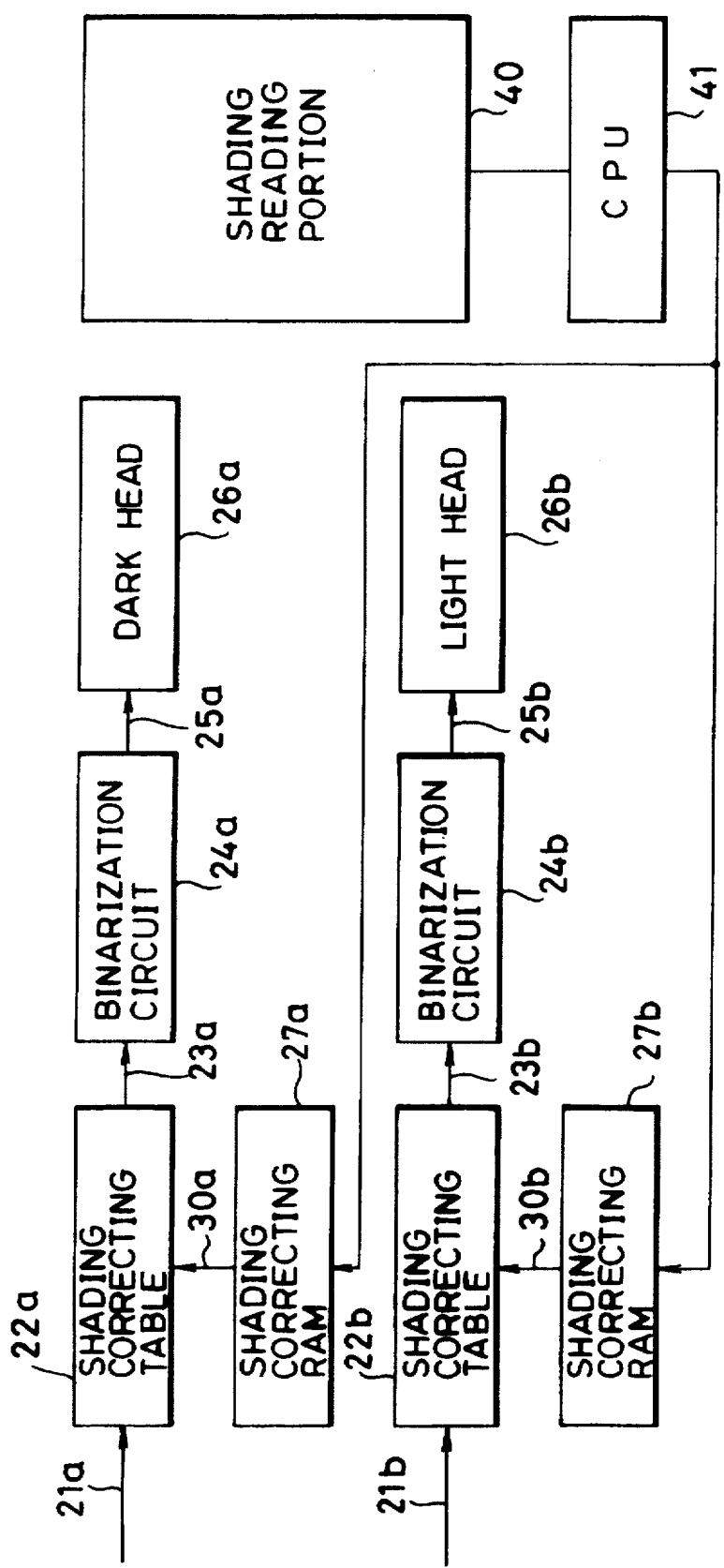
FIG. 7 is a block diagram showing an image processing circuit of an ink jet recording apparatus according to embodiment 1 of the present invention.

FIG. 7 is a block diagram showing mainly an image processing circuit of an ink jet recording apparatus according to embodiment 1 of the present invention.

In FIG. 7, a dark head 26a and a light head 26b are ink jet recording heads that eject inks having different densities from each other, and each of the heads includes 256 orifices and a driving circuit corresponding to these orifices.

Figure 1:
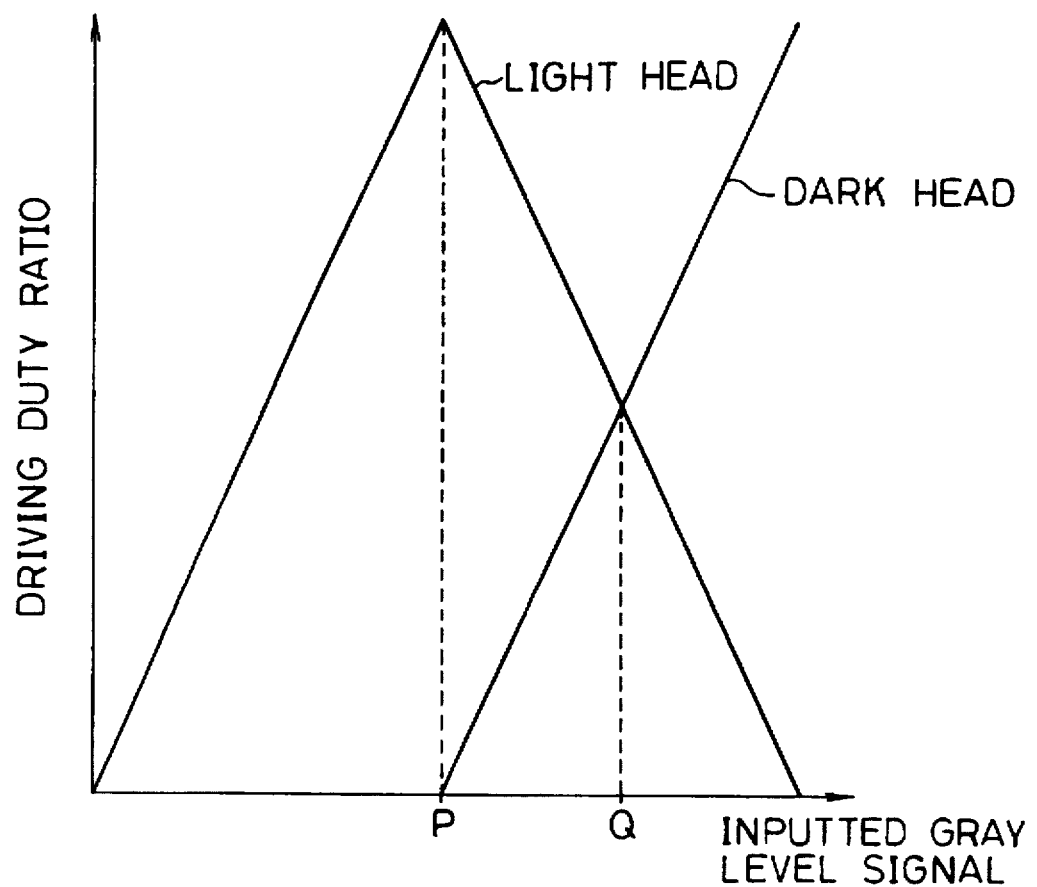
FIG. 1 is a graph illustrating the distribution of image signals when recording is made by using both dark and light heads.
Figure 2:
FIG. 2 is a graph showing the relation between gray level of recorded images and inputted gray level signals.
Figure 3A:
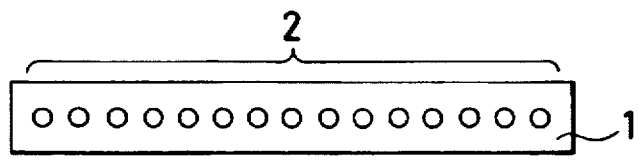
FIGS. 3A to 3E are graphs illustrating the correction of the shading.
Figure 3B:
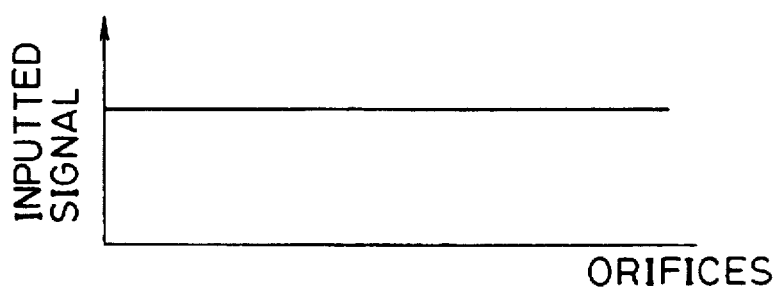
Figure 3C:
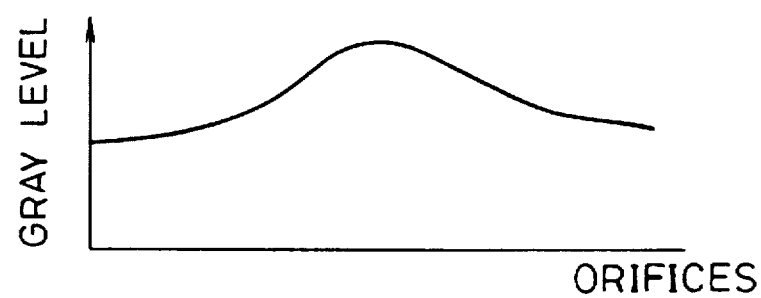
Figure 3D:
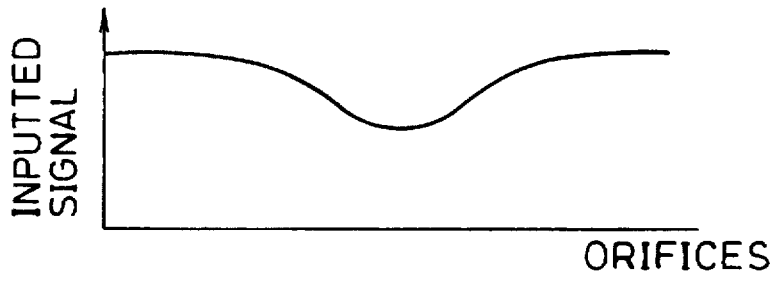
Figure 3E:
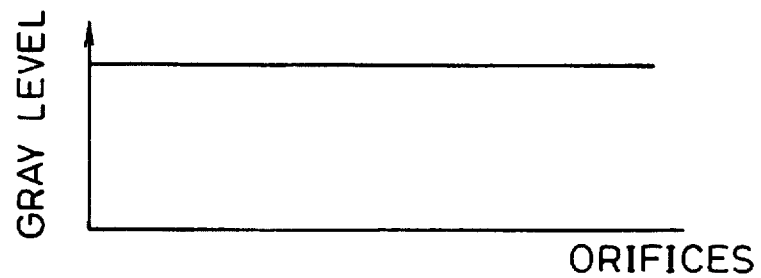

Image signals 21a and 21b corresponding to each of the recording heads 26a and 26b are inputted from a host computer and/or an image reading portion to the circuit shown in FIG. 7. The input image signals 21a and 21b are signals after the distribution of image signals to the dark and the light heads as shown in FIG. 1.

Figure 8:
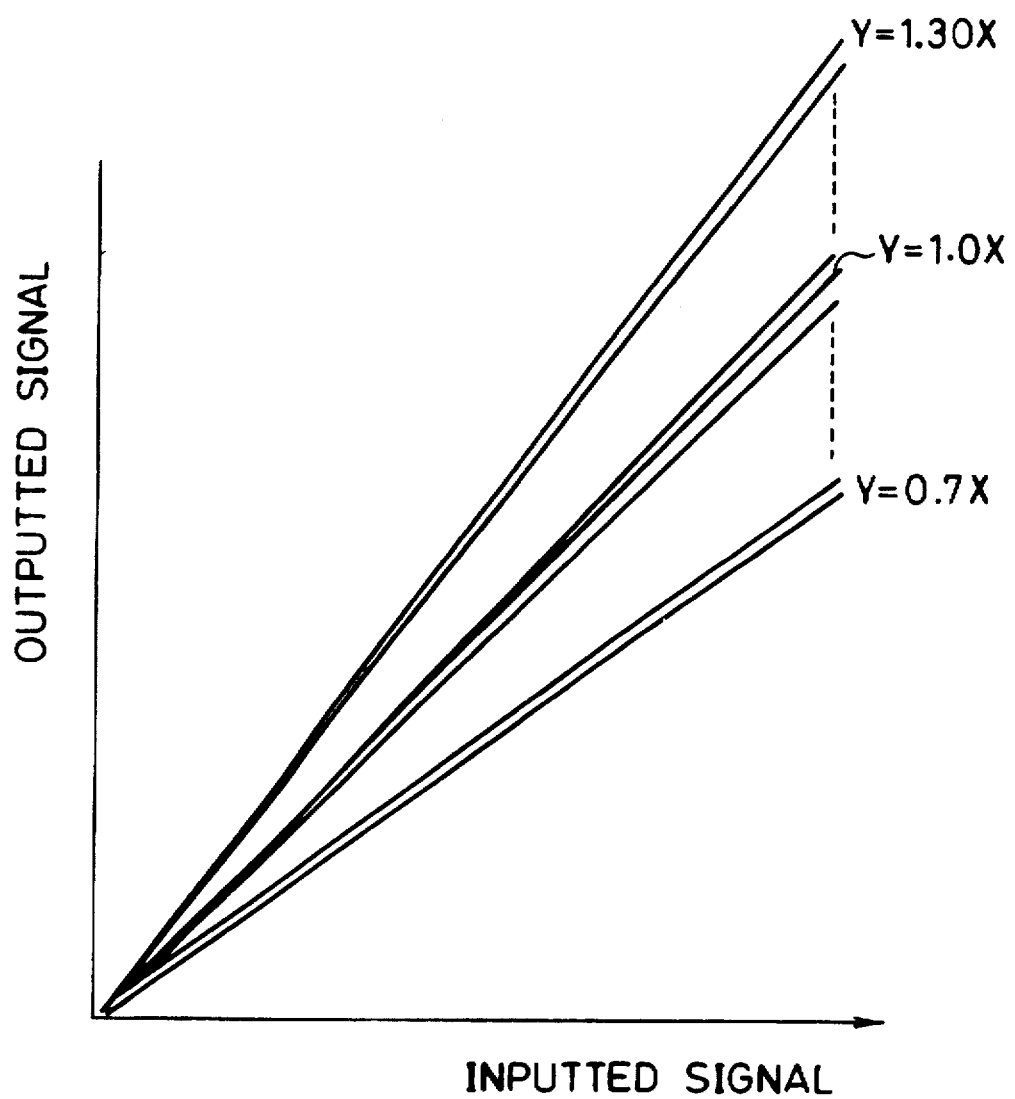
FIG. 8 is a graph illustrating a correction table shown in FIG. 7.

The input image signals 21a and 21b are respectively inputted to shading correcting tables 22a and 22b. The shading correcting tables 22a and 22b have 61 correcting straight lines (γ line) whose slopes are respectively different by 0.01 from Y=0.70 X to Y=1.30 X as shown in FIG. 8, in which the correcting straight lines are switched by shading correcting data signals 30a and 30b inputted to each table. For example, when the input image signal corresponding to an orifice which ejects ink to form a large dot is inputted, a correcting straight line with small slope is selected by the shading correcting data signal, and the image signal is corrected. While, when the input image signal corresponding to an orifice recording a small dot is inputted, a correcting straight line with a large slope is selected, and the image signal is corrected. Selecting data for the correcting straight necessary to correct the shading caused by each of recording heads 26a and 26b, are stored in shading correcting RAMs 27a and 27b. That is, the shading correcting data each of which has one of 61 kinds of values, 0 to 60, and corresponds to each of 256 orifices, are stored in the RAMs 27a and 27b. The RAMs 27a and 27b respectively output the shading correcting data signals 30a and 30b as selecting data according to a counter output signal (not shown). The signals 23a and 23b corrected by using the γ straight lines of FIG. 8 which are selected according to the shading correcting data signals 30a and 30b, are respectively expressed in the binary system by binarization circuits 24a and 24b, in which a dither method, an error distribution method or the like may be used. The dark head 26a and the light head 26b are driven on the basis of these binarization signals 25a and 25b, respectively, and the ink is ejected so that the image is recorded.

A shading reading portion 40 in the ink jet recording apparatus is provided with a CCD having more than 256 reading elements. It can read the image recorded on a recording paper. In a digital copy machine which reads out an original image by using the CCD and makes a copy, the CCD for image reading can be also used as the shading reading portion.

Next, a processing for setting the shading correcting data according to embodiment 1 of the present invention will be explained.

Figure 9:
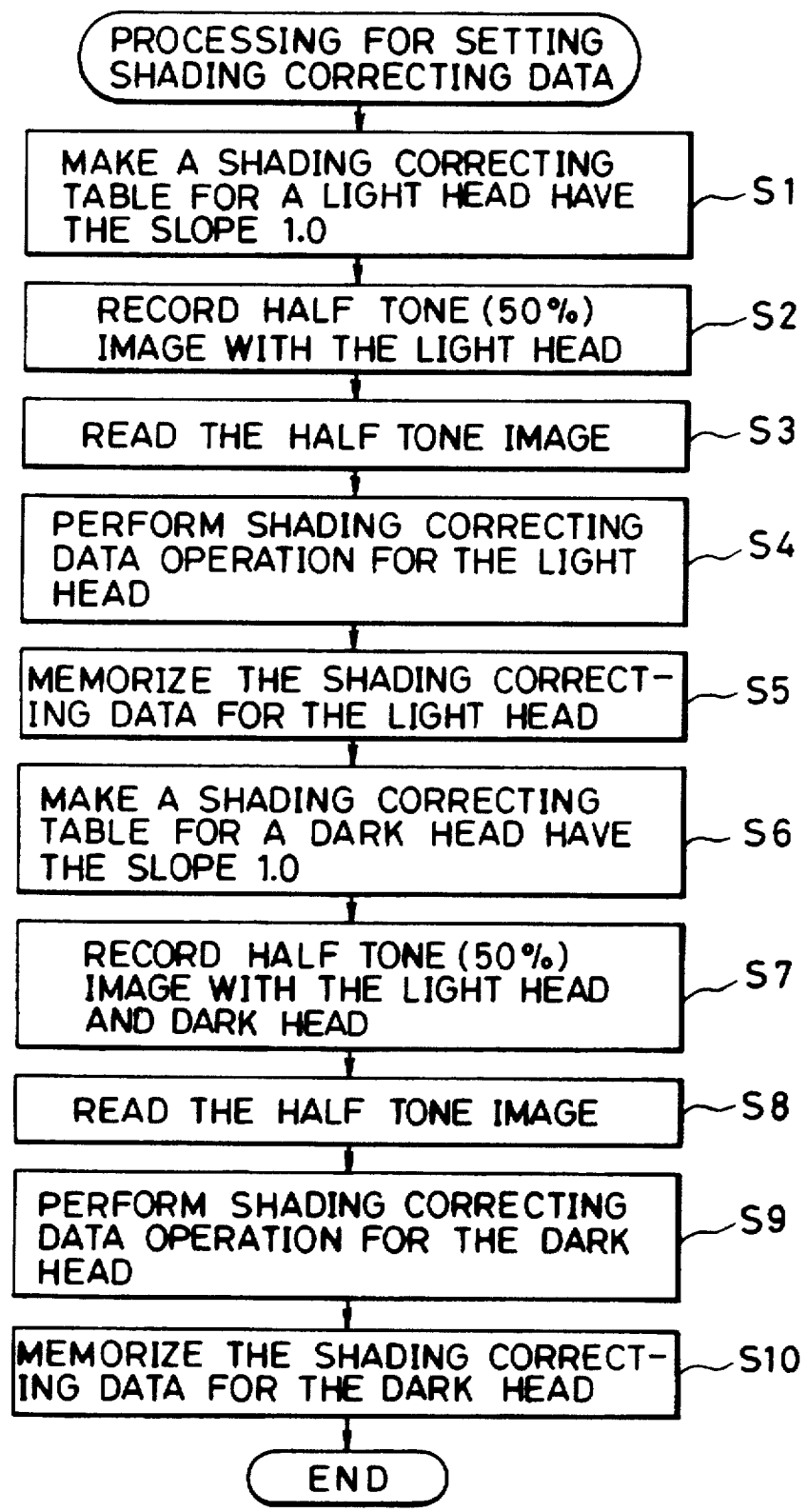
FIG. 9 is a flow chart showing the procedure of setting shading correcting data of embodiment 1.

FIG. 9 is a flow chart showing the processing for setting the shading correcting data. In FIG. 9, under the condition that the shading correcting table 22b of each orifice in the light head 26b is all a straight line with the slope 1.0 (step S1), and the input image signal 21b is a 50% half-tone signal, the recording is performed by using the light head 26b (step S2). Thereafter, the half-tone image is read by the shading reading portion 40 (step S3), and the shading correcting data for the light head is calculated (step S4). The calculation is carried out as follows.

Assuming that reading data from the reading portion 40 corresponding to each of dots formed by the ink ejected from each of 256 orifices are $I_1$ through $I_{256}$, these data are taken logarithms of thereafter to be transformed into gray level data $D_1$ through $D_{256}$. Next, the mean value of the data is obtained.

$$\overline{D} = \sum_{n=1}^{256} Dn/256 \quad (2)$$

The following Un is obtained to each of the gray level data $D_1$ through $D_{256}$.

$$Un = \overline{D}/Dn \quad (3)$$

The shading correcting data is obtained on the basis of the value of Un. For example, when Un=1.1, the gray level of the dot formed by the ink ejected from this orifice is 1/1.1 times as large as the mean gray level formed through the orifices. Therefore, the shading correcting data for this orifice is set so that the correction straight line with the slope 1.1 is selected.

After setting the shading correcting data for selecting the correction straight line according to the value of Un in the manner described above, the shading correcting data are stored in the shading correcting RAM27b (step S5).

As to the light head 26b, the shading is corrected in accordance with the shading correcting data obtained as mentioned above. With respect to the dark head 26a, all the contents of the shading correcting table 22a are made straight lines with the slope 1.0 (step S6). Next, both the input signals 21a and 21b respectively corresponding to the dark head 26a and the light head 26b are set to a half-tone (50%) signal, and the half-tone image are recorded by using the dark and the light heads 26a, 26b (step S7). This recording corresponds to the recording when the gray level represented by the input gray level signal before it is distributed to the input image signals corresponding to the dark and the light heads, substantially equals to Q level shown in FIG. 1.

Next, the half-tone image recorded is read by the shading reading portion 40 (step S8), and in a similar processing mentioned above, the shading correcting data for the dark head is set (step S9). Finally, the shading correcting data are stored in the shading correcting RAM27a and the making steps are finished (step S10).

In case that the shading correcting data made as mentioned above is used, since only the light head is used when the gray level represented by the input gray level signal is less than the value P shown in FIG. 1, the shading can be precisely corrected by the shading correcting data made by the light head alone. While since the images formed by the dark and the light heads are superimposed upon each other, when the input gray level signal is more than the value P, the shading can be precisely corrected by the shading correcting data made in such a manner that the whole shading may be eliminated in the state which both images by the dark and light heads are superimposed upon each other. Therefore, the remarkable shading is not produced, comparing with the conventional method in which the images are superimposed upon each other after the shading caused by each head is corrected alone.

Embodiment 2

Figure 10:
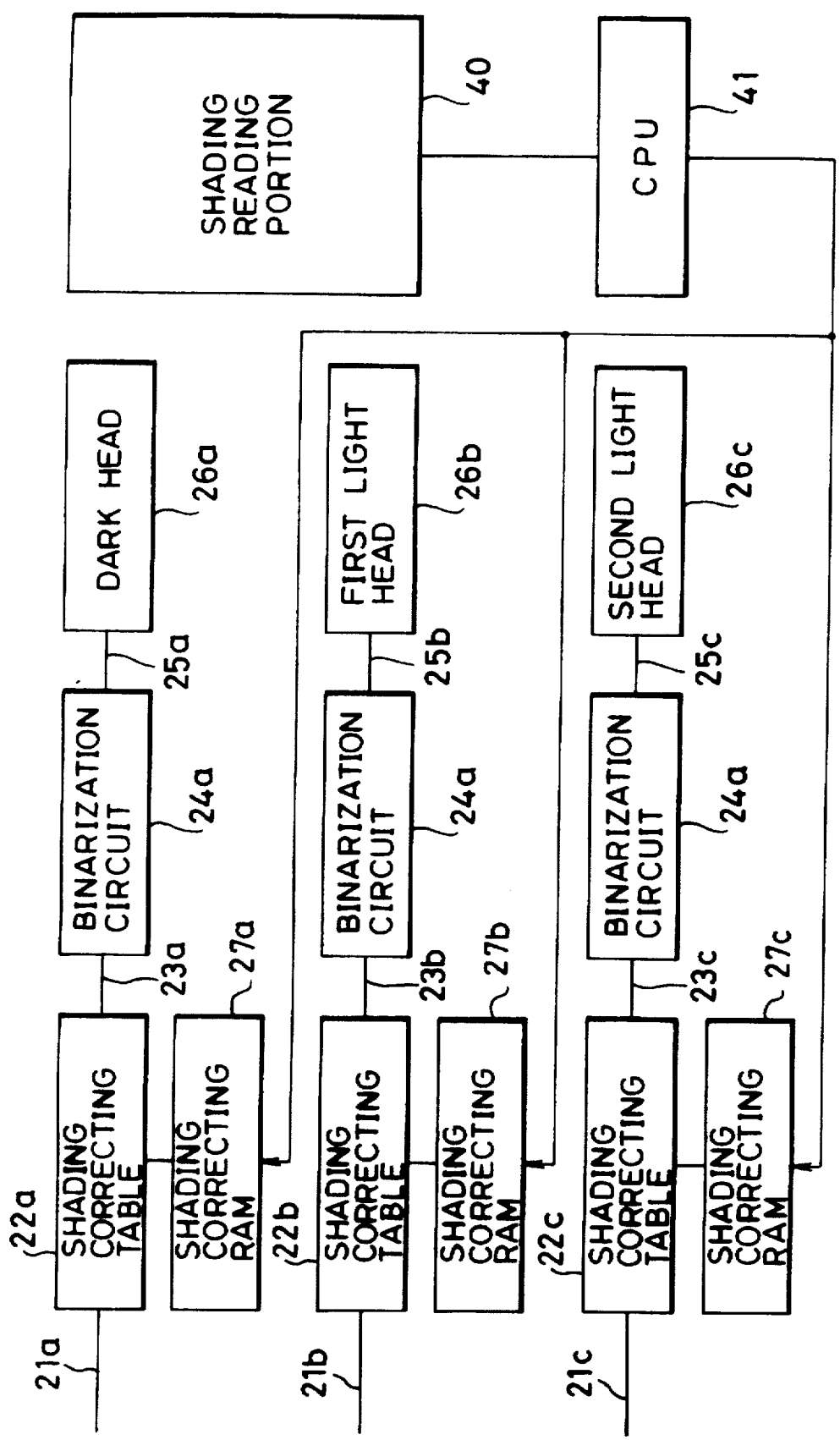
FIG. 10 is a block diagram showing an image processing circuit of an ink jet recording apparatus according to embodiment 2 of the present invention.
Figure 11:
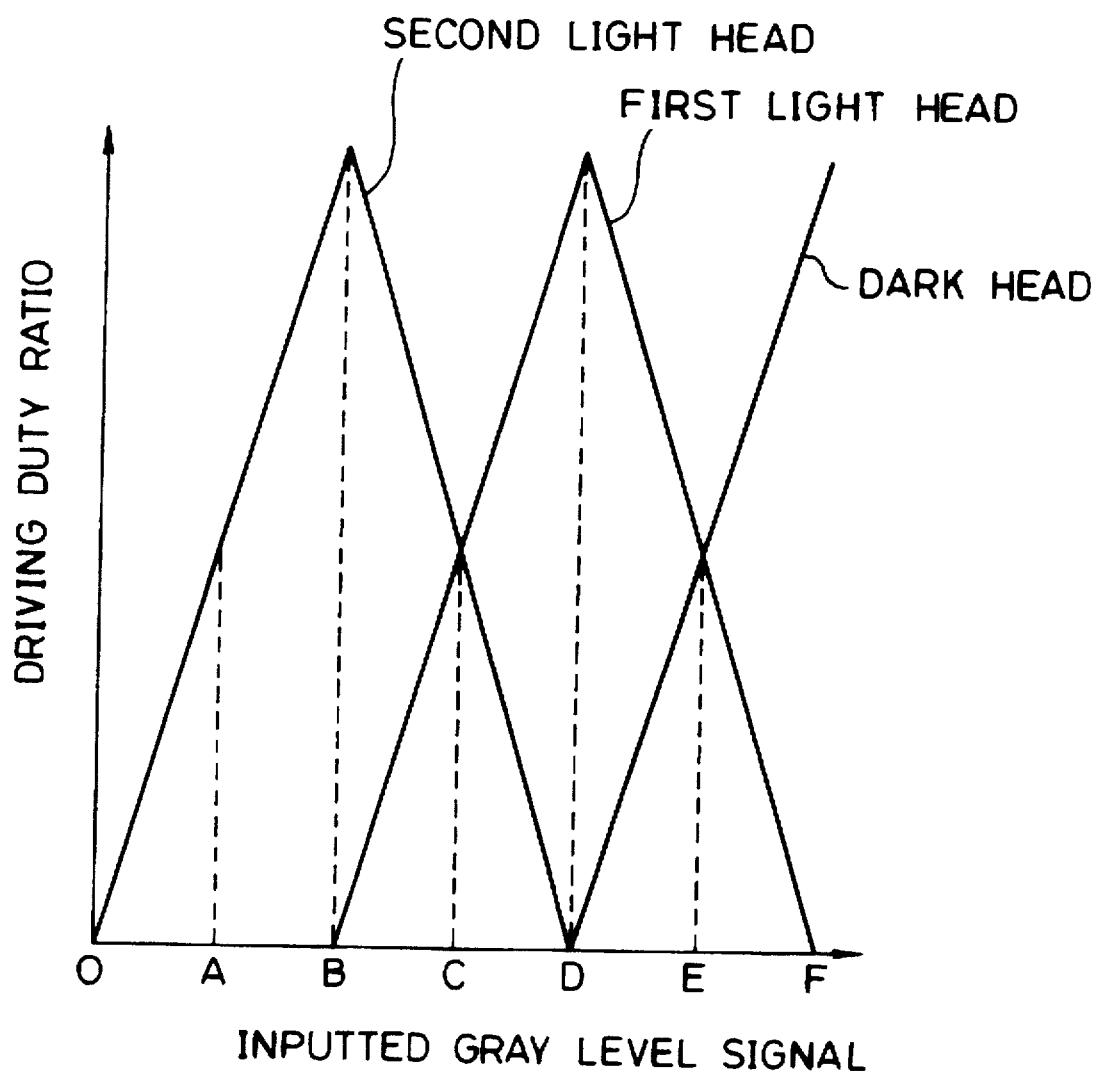
FIG. 11 is a graph illustrating the distribution of input gray level signals of embodiment 2.

FIG. 10 is a block diagram mainly showing the image processing circuit of the recording apparatus according to embodiment 2 of the present invention. Like reference numerals identify components corresponding to those of FIG. 7. In this embodiment, there are provided ink jet recording heads corresponding to three kinds of ink density. That is, a dark head uses ink of the maximum density (gray level) 1.5 to record, a first light head uses ink of the maximum density 0.8, and a second light head uses ink of the maximum density 0.4. FIG. 11 is a graph showing the concept of a distribution table for distributing input gray level signals to each head of Embodiment 2. When the input gray signals are within the range of 0 to B, the recording is made only by the second light head 26c, when within the range of B to D, the recording is made by the superimposition of the second light head 26c and the first light head 26b, and when within the range of D to F, the recording is made by the superimposition of the first light head 26b and the dark head 26a, thereby the recording can be made over the whole gray level. In this case, the shading correcting data is made as follows.

First, in a similar manner as embodiment 1, the recording in 50% half-tone is performed by using the second light head 26c, and by reading this half-tone image, the shading correcting data for the second light head is set. Second, by using the second light head 26c corrected by the shading correcting data and the first light head 26b not corrected, the recording is performed by the superimposition of them in 50% half-tone. The recorded image is read and the shading correcting data for the first light head 26b is set in a similar manner as embodiment 1.

By using the first light head 26b corrected by the shading correcting data and the dark head 26a not corrected, the recording is performed by the superimposition of them in 50% half-tone, thereby the shading correcting data for the dark head 26a is set.

In other words, the recording are performed in the input gray level signals at each point of A, C, E shown in FIG. 11, and the shading correcting data for each head is set on the basis of each recorded image.

According to the shading correcting data made in such a manner, the correcting curve is selected and the shading is corrected. Therefore, it is possible to obtain a recorded image without any shading.

Embodiment 3

Embodiment 3 of the present invention relates to an application of the present invention to an apparatus for outputting a color picture image, in which four kinds of ink, namely, cyan, magenta, yellow and black are used, and dark and the light heads, two heads for each kind of ink are used.

The present embodiment has the same construction as that of FIG. 7 with respect to each of the colors cyan, magenta, yellow and black. If the shading correcting data is set in the same method as embodiment 1, the same effects are obtained in the color picture image.

In the above embodiments, a plurality of recording heads using the same color and different gray level of ink is used to correct the shading. However, it is to be appreciated that the present invention is also effective to another system, heads using the same color and the same ink, and plurality of recording heads using different ink.

Further, in the above embodiments, the recording head used for the ink jet system was explained. However, the present invention is not limited within the scope of these applications, it may be possible to apply it to various systems such as thermal printing, and an electrostatic printer, including a multiple head in which a plurality of recording elements are arranged.

Furthermore, in the above embodiments, the shading is corrected by changing the number of dots. However, it is possible to modify the diameter of the dot to correct.

Figure 12:
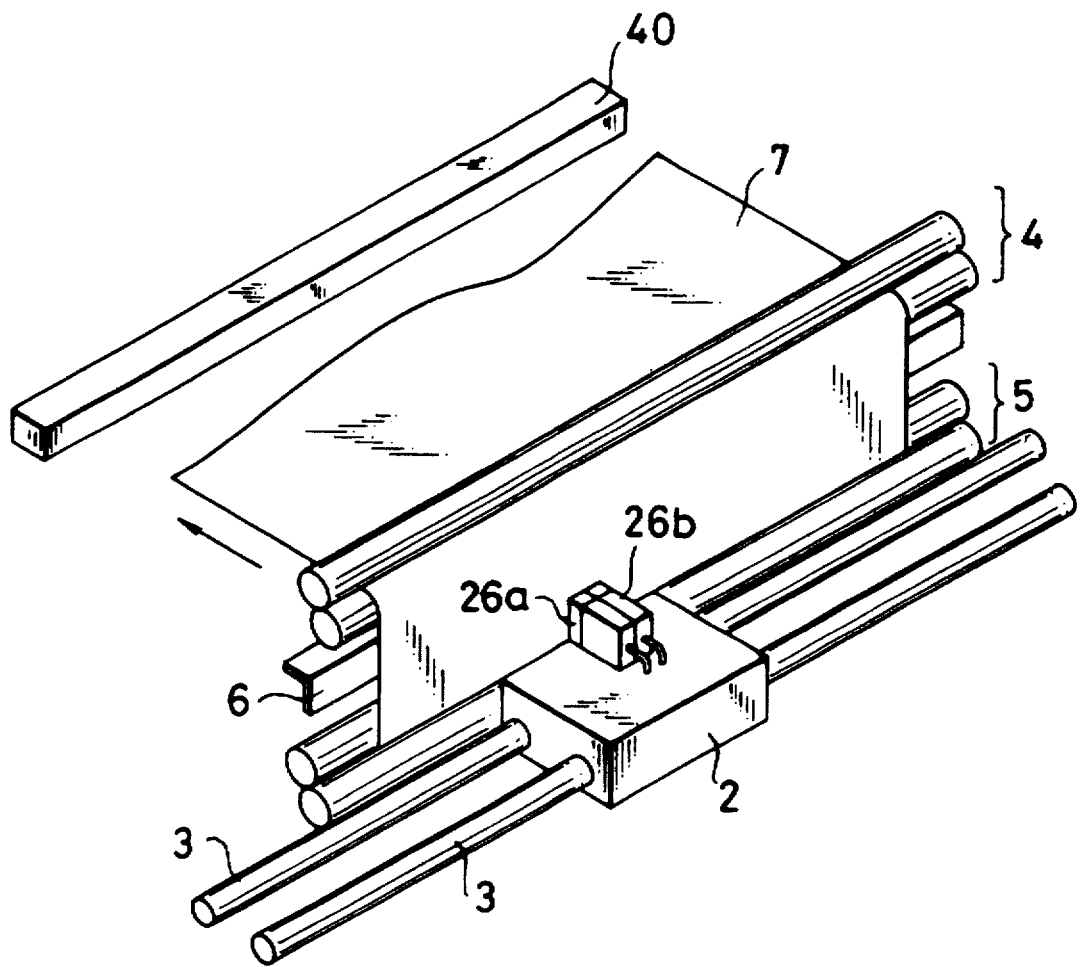
FIG. 12 is a schematic perspective view showing the main portion of an ink jet recording apparatus to which the present invention is applicable.

FIG. 12 is a schematic perspective view showing the main portion of the ink jet recording apparatus to which the present invention is applicable.

In FIG. 12, the recording heads 26a and 26b respectively corresponding to the dark and the light heads are provided with 256 ink orifices (not shown) in the direction of transfer of a recording paper 7 and opposing the recording paper 7. Further, the recording heads 26a and 26b include ink paths (not shown) each of which is connected to each of 256 orifices, respectively, and electro-thermal converting elements which generate thermal energy for ejecting ink are formed on a substrate composing each of the recording heads 26a and 26b corresponding to each of the ink paths. The electro-thermal converting elements generate heat by driving pulses applied thereto in response to the driving data, thereby film boiling is produced in the ink and the ink is ejected from the orifices by the production of bubbles due to the film boiling. There is provided a common chamber connected commonly to each ink path. The ink stored in the common chamber is supplied to associated ink paths in response to ejecting action in each ink paths.

A carriage 2 carries the recording heads 26a and 26b, and engages slidably with a pair of guide rails 3 extending parallel to the recording face of the recording paper 7. Therefore, the recording heads 26a and 26b can move along the guide rails 3. When the heads move, they eject the ink at the predetermined timing and make a recording. After the movement, the recording paper 7 is transferred by the predetermined distance in the direction of arrow shown in FIG. 12. The heads 26a and 26b move again in the same way and make a recording. By repeating such an operation, the recording paper 7 is recorded in order.

The recording paper 7 can be transferred by rotating a pair of transfer rollers 4 and 5 each disposed on the up and down of the recording face. A platen 6 is disposed on the back of the recording face of the recording paper 7 in order to maintain a plane of the recording face.

It is possible to move the carriage by providing a belt (not shown) attached to the carriage and driving it by a motor (not shown). And it is possible to rotate the transfer rollers 4 and 5 by transmitting the rotation of a motor (not shown) to them. Further, the shading reading portion 40 is disposed downstream of a transfer path of the recording paper 7 (not shown in FIG. 12).

The present invention achieves distinct effect when applied to a recording head or a recording apparatus which has means for generating thermal energy such as electro-thermal transducers or laser light, and which causes changes in ink by the thermal energy so as to eject ink. This is because such a system can achieve high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces a sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A recording apparatus for performing recording by using a plurality of recording heads which can record in a superposed manner, each said recording head having a plurality of recording elements, at least some of which may have variations in recording characteristics therebetween, comprising:

a first correcting data setting means for producing a plurality of first shading correcting data which are respectively used for correcting a first shading corresponding to a plurality of said recording elements of a first recording head of the plurality of recording heads, based on a predetermined first image recorded by using said first recording head, said first shading arising due to the variations in recording characteristics of respective said recording elements of said first recording head; and a second correcting data setting means for producing a plurality of second shading correcting data each of which is used for correcting a second shading corresponding to a plurality of said recording elements of a second recording head of the plurality of recording heads, based on a second image recorded by recording a second portion of said second image using said second recording head in a superposing manner on a first portion of said second image recorded by means of said first recording head using said first shading correcting data produced by said first correcting data setting means, said second shading arising due to the variations in recording characteristics of respective said recording elements of said second recording head.

2. A recording apparatus as claimed in claim 1, wherein said first recording head and said second recording head are used at respective predetermined ratios corresponding to a gray level of an image to be recorded in the recording apparatus.

3. A recording apparatus as claimed in claim 2, wherein a density of images recorded by said first recording head and said second recording head are different from each other.

4. A recording apparatus as claimed in claim 3, wherein the density of images recorded by said first recording head is lower than that of said second recording head.

5. A recording apparatus as claimed in claim 4, wherein each of the plurality of recording heads utilizes a thermal energy to generate at least one bubble in an ink, and ejects the ink due to growth of said at least one bubble.

6. A recording apparatus as claimed in claim 1, further comprising an image reading means for reading an image, wherein said first correcting data setting means and said second correcting data setting means produce the first shading correcting data and the second shading correcting data, respectively, based on an image read by said image reading means.

7. A recording apparatus as claimed in claim 1, further comprising a recording control means for performing recording by driving said first recording head based on the first shading correcting data and by driving said second recording head based on the second shading correcting data.

8. A shading correcting method of a recording apparatus for performing recording by using a plurality of recording heads which can record in a superposed manner, each of the recording heads having a plurality of recording elements, at least some of which may have variations in recording characteristics therebetween, comprising the steps of:

a first recording step of recording a first predetermined image by using a first recording head of the plurality of recording heads;

a first shading data setting step of setting a plurality of first shading correcting data which are respectively used for correcting a first shading corresponding to a plurality of the recording elements of the first recording head used in said first recording step, based on said first predetermined image, said first shading arising due to the variations in recording characteristics of the recording elements of the first recording head;

a second recording step of recording a second predetermined image by recording a first portion of said second predetermined image by means of the first recording head using said first shading correcting data set by said first shading data setting step, and successively recording a second portion of said second image using a second recording head in a superposing manner on said first portion of said second image recorded by means of the first recording head; and a second shading data setting step of setting a plurality of second shading correcting data which are respectively used for correcting a second shading corresponding to a plurality of recording elements of said second recording head used in said second recording step, based on said second predetermined image recorded by said second recording step, said second shading having been caused by the variations in recording characteristics of respective recording elements of the second recording head.

9. A shading correcting method as claimed in claim 8, further comprising an image reading step for reading an image, wherein the first shading correcting data and the second shading correcting data are produced in said first shading data setting step and said second shading data setting step, respectively, based on an image read by said image reading step.

10. A recording method comprising the steps of:

a step of providing a plurality of recording heads, each said recording head having a plurality of recording elements, at least some of which may have variations in recording characteristics therebetween;

a first recording step of recording a first predetermined image by using a first recording head of the plurality of recording heads;

a first shading data setting step of setting a plurality of first shading correcting data which are respectively used for correcting a first shading corresponding to a plurality of the recording elements of said first recording head used in said first recording step, based on said first predetermined image, said first shading arising due to the variations in recording characteristics of respective recording elements of said first recording head;

a second recording step of recording a second predetermined image by recording a first portion of said second predetermined image by means of the first recording head using said first shading correcting data set by said first shading data setting step, and successively recording a second portion of said second image by means of a second recording head in a superposing manner on said first portion of said second image recorded using the first recording head;

a second shading data setting step of setting a plurality of second shading correcting data which are respectively used for correcting a second shading corresponding to a plurality of recording elements of the second recording head used in said second recording step, based on said second predetermined image recorded by said second recording step, said second shading arising due to the variations in recording characteristics of respective recording elements of the second recording head; and performing recording by using the first recording head and the second recording head, the first recording head and the second recording head using respective said shading correcting data.

11. A decreasing method for decreasing a shading in an image which is recorded by superposing an image recorded by a recording head on another image recorded by an other recording head, said method comprising the steps of:

providing a plurality of recording heads, including the recording head and the other recording head, each recording head having a plurality of recording elements, at least some of which may have variations in recording characteristics therebetween;

a first recording step of recording a first predetermined image by using a first recording head of the plurality of recording heads;

a first shading data setting step of setting a plurality of first shading correcting data which are respectively used for correcting a shading corresponding to the plurality of recording elements of the first recording head used in said first recording step, based on said first predetermined image, said shading arising due to the variations in the recording characteristics of respective recording elements of the first recording head;

a second recording step of recording a second, predetermined image by recording a first portion of said second predetermined image by means of the first recording head using said first shading correcting data set by said first shading data setting step, and successively recording a second portion of said second image by means of a second recording head in a superposing manner on said first portion of said second image recorded using said first recording head;

a second shading data setting step of setting a plurality of second shading correcting data which are respectively used for correcting a shading corresponding to the plurality of recording elements of the second recording head used in said second recording step, based on said second predetermined image recorded by said second recording step, said shading arising due to the variations in the recording characteristics of respective recording elements of the second recording head; and performing recording by using the first recording head and the second recording head, the first recording head and the second recording head using respective said shading correcting data.

12. A decreasing method for decreasing a shading in an image which is recorded by superposing an image recorded by a recording head on an other image recorded by an other recording head, said method comprising the steps of:

providing a plurality of recording heads, including the recording head and the other recording head, each said recording head having a plurality of recording elements, at least some of which may have variations in recording characteristics therebetween;

recording a predetermined image by recording a first portion of said predetermined image by means of the recording head, and successively recording a second portion of said predetermined image by means of the other recording head in a superposing manner on said first portion of said predetermined image recorded using said recording head;

setting a plurality of shading correcting data which are respectively used for correcting a shading corresponding to the recording elements of the recording head used in said recording step, based on said predetermined image recorded by said recording step, said shading arising due to the variations in the recording characteristics of respective recording elements of the recording head; and performing recording by using the recording head using said shading correcting data set by said setting step of shading data and the other recording head.

13. A recording apparatus for performing recording in which an image is recorded by superposing an image recorded by a recording head or a plurality of recording heads on an other image recorded by an other recording head of the plurality of recording heads, each recording head having a plurality of recording elements, at least some of which may have variations in recording characteristics therebetween, said apparatus comprising:

a recording means for recording a predetermined image by recording a first portion of said predetermined image by means of the recording head, and successively recording a second portion of said predetermined image by the other recording head in a superposing manner on said first portion of said predetermined image recorded using said recording head; and a setting means for setting a plurality of shading correcting data which are respectively used for correcting a shading corresponding to the recording elements of the recording head used by said recording means, based on said predetermined image recorded by said recording means, said shading arising due to the variations in the recording characteristics of respective recording elements of the recording head.

\* \* \* \* \*

UNITED STATES PATENT AND TRADEMARK OFFICE
CERTIFICATE OF CORRECTION

PATENT NO. : 5,777,641

DATED : July 7, 1998

INVENTOR(S) : AKIO SUZUKI ET AL.                    Page 1 of 3

It is certified that error appears in the above-identified patent and that said Letters Patent is hereby corrected as shown below:

IN THE DRAWINGS

Figure 4:
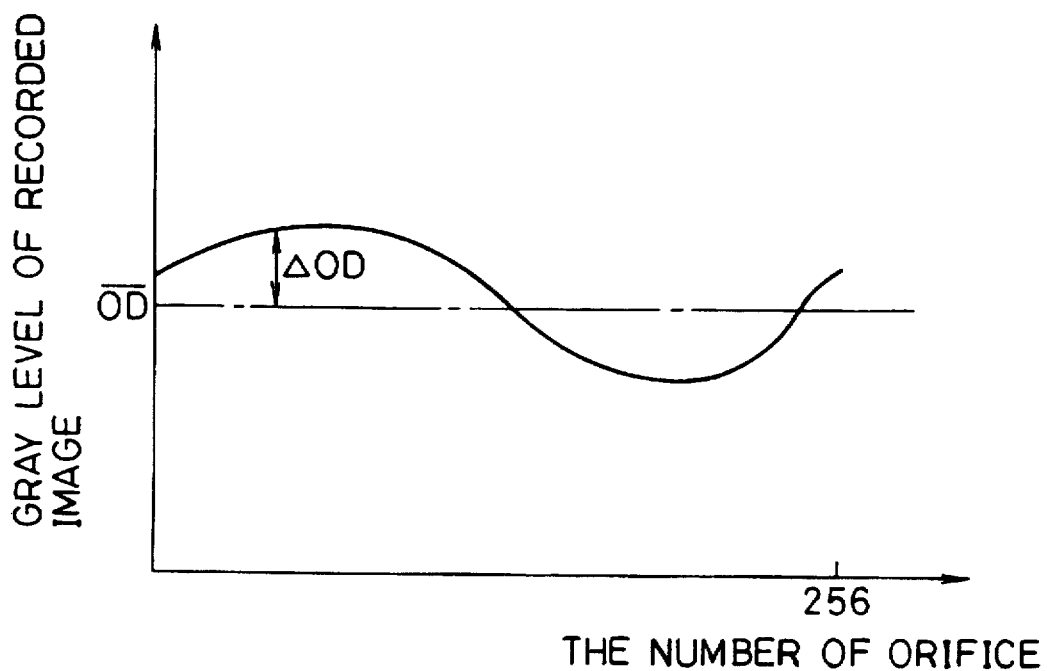
FIG. 4 is a graph illustrating operation for the correction of the shading.
Figure 5:
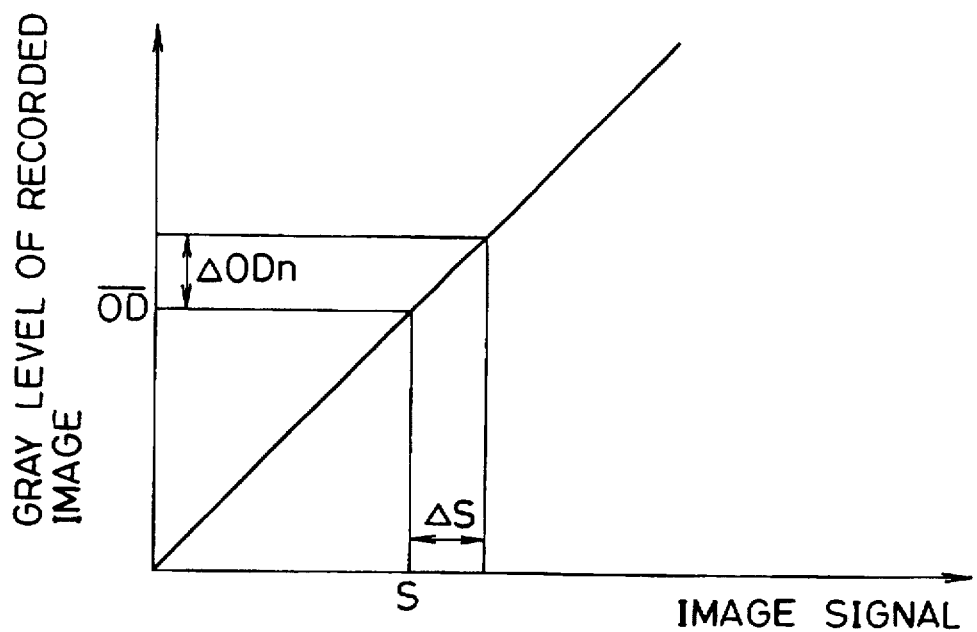
FIG. 5 is a graph illustrating operation for the correction the shading.
Figure 6:
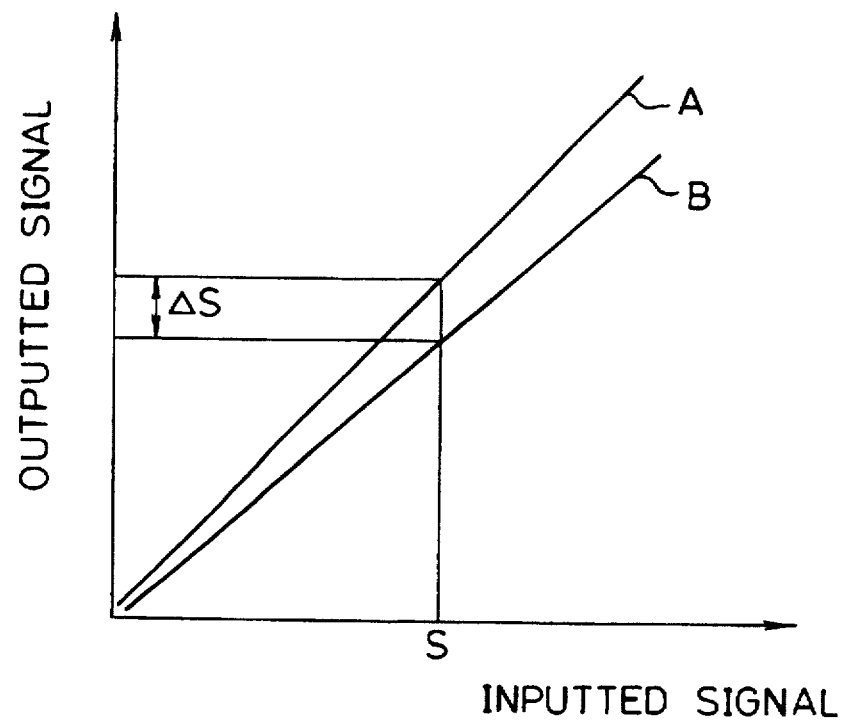
FIG. 6 is a graph illustrating operation for the correction of the shading.

Figure 4, "ORIFICE" should read --ORIFICES--.

COLUMN 1

Line 60, "equally in" should read --with equal--; and
    Line 61, "is," should read --is--.

COLUMN 2

Line 1,  "recording" should read --different recording--;
    Line 17, "record" should read --recording--;
    Line 29, "while" should be deleted;
    Line 45, "the" should read --a-- and "an" should read
             --the--; and
    Line 52, "solved." should read --solved:--.

COLUMN 3

Line 16, "to" should read --for--;
    Line 32, "predetermined first" should read --first
             predetermined--;
    Line 42, "head," should read --heads,-- and "heads" should
             read --head--; and
    Line 45, "motors" should read --not one--.

COLUMN 4

Line 3,  "head" should read --each head--; and
    Line 31, "plural of" should read --plural--.

UNITED STATES PATENT AND TRADEMARK OFFICE
CERTIFICATE OF CORRECTION

PATENT NO. : 5,777,641

DATED : July 7, 1998

INVENTOR(S) : AKIO SUZUKI ET AL.

It is certified that error appears in the above-identified patent and that said Letters Patent is hereby corrected as shown below:

COLUMN 5

Line 7, "elements" should read --elements of--;
    Line 16, "the recordings" should read --recordings--;
    Line 20, "of" should be deleted; and
    Line 21, "shading" should read --shadings--.

COLUMN 6

Line 20, "small" should read --a small--; and
    Line 25, "straight" should read --straight line--.

COLUMN 7

Line 7, "to" should read --for--;
    Line 28, "image" should read --images--; and
    Line 54, "comparing with" should read --compared to--.

COLUMN 8

Line 28, "are performed in" should read --is performed by--.

COLUMN 9

Line 18, "paths." should read --path.--.

UNITED STATES PATENT AND TRADEMARK OFFICE
CERTIFICATE OF CORRECTION

PATENT NO. : 5,777,641

DATED : July 7, 1998

INVENTOR(S) : AKIO SUZUKI ET AL.

It is certified that error appears in the above-identified patent and that said Letters Patent is hereby corrected as shown below:

COLUMN 10

Line 30, "consists" should read --consist--.

COLUMN 13

Line 64, "second." should read --second--.

COLUMN 14

Line 45, "or" should read --of--.

Signed and Sealed this

Twenty-seventh Day of April, 1999

Attest:

Q. TODD DICKINSON

Attesting Officer

Acting Commissioner of Patents and Trademarks